United States Patent
Ueno

(10) Patent No.: US 10,545,056 B2
(45) Date of Patent: Jan. 28, 2020

(54) THERMAL HISTORY CHANGE TYPE INDICATOR

(71) Applicant: NISSIN FOODS HOLDINGS CO., LTD., Osaka-shi, Osaka (JP)

(72) Inventor: Tomohiro Ueno, Osaka (JP)

(73) Assignee: NISSIN FOODS HOLDINGS CO., LTD., Osaka (JP)

(*) Notice: Subject to any disclaimer, the term of this patent is extended or adjusted under 35 U.S.C. 154(b) by 348 days.

(21) Appl. No.: 15/509,767

(22) PCT Filed: Sep. 11, 2015

(86) PCT No.: PCT/JP2015/075912
§ 371 (c)(1),
(2) Date: Mar. 8, 2017

(87) PCT Pub. No.: WO2016/039460
PCT Pub. Date: Mar. 17, 2016

(65) Prior Publication Data
US 2017/0261384 A1    Sep. 14, 2017

(30) Foreign Application Priority Data
Sep. 12, 2014   (JP) .................. 2014-186699

(51) Int. Cl.
*G01K 11/12* (2006.01)
*G01K 11/06* (2006.01)
(Continued)

(52) U.S. Cl.
CPC .............. *G01K 11/12* (2013.01); *A23L 7/113* (2016.08); *B65D 25/205* (2013.01);
(Continued)

(58) Field of Classification Search
CPC ........ G01K 11/12; G01K 11/06; G01K 11/18; G01K 3/04; Y10S 252/962; B65D 25/205;
(Continued)

(56) References Cited

U.S. PATENT DOCUMENTS 3,967,579 A   7/1976   Seiter
4,428,321 A   1/1984   Arens
(Continued)

FOREIGN PATENT DOCUMENTS

CN    1721831      1/2006
EP    1 560 009    8/2005
(Continued)

OTHER PUBLICATIONS

Search Report issued in corresponding Russian Patent Application No. 2017107813, Apr. 2, 2018, 5 pages with an English translation.
(Continued)

*Primary Examiner* — Nimeshkumar D Patel
*Assistant Examiner* — Tania Courson
(74) *Attorney, Agent, or Firm* — Hamre, Schumann, Mueller & Larson, P.C.

(57) ABSTRACT

There are provided: a thermal history change type indicator by which the degree of reconstitution with hot water of instant cup noodles can be easily visually recognized in conjunction with the temperature in a container; and a set of a thermal history change type indicator and instant cup noodles comprising the thermal history change type indicator and instant cup noodles.
The thermal history change type indicator comprises: a thermally meltable material layer containing a thermally meltable material; a permeation layer, wherein the permeation layer becomes transparent or translucent when the thermally meltable material melts and permeates the perme-
(Continued)

ation layer; a thermally meltable material permeation-inhibiting layer for inhibiting the permeation of the thermally meltable material into the permeation layer, wherein the thermally meltable material permeation-inhibiting layer is arranged between the thermally meltable material layer and the permeation layer; and a protective layer, wherein the thermally meltable material layer, the permeation layer, and the thermally meltable material permeation-inhibiting layer are layered, and the permeation layer side of the layered product is covered with the protective layer. The set of a thermal history change type indicator and instant cup noodles comprises the thermal history change type indicator and instant cup noodles.

12 Claims, 2 Drawing Sheets

(51) Int. Cl.
    *G01K 11/18*     (2006.01)
    *A23L 7/113*     (2016.01)
    *B65D 25/20*     (2006.01)
    *B65D 85/816*     (2006.01)

(52) U.S. Cl.
    CPC ............ *B65D 85/816* (2013.01); *G01K 11/06* (2013.01); *G01K 11/18* (2013.01); *A23V 2002/00* (2013.01)

(58) Field of Classification Search
    CPC .... B65D 85/816; A23L 7/113; A23V 2002/00
    USPC .......... 116/207, 216, 219, 200, 206; 426/88, 426/232; 374/E3.004, 159–162, 100, 374/150, 157, 208, 141
    See application file for complete search history.

(56) References Cited

U.S. PATENT DOCUMENTS

| | | | |
|---|---|---|---|
| 5,057,434 A | 10/1991 | Prusik et al. | |
| 5,667,303 A * | 9/1997 | Arens | G01K 3/04 116/219 |
| 10,451,595 B2 * | 10/2019 | Patel | G01K 3/04 |
| 2006/0011124 A1 | 1/2006 | Odashiro | |
| 2008/0009067 A1 | 1/2008 | Faran | |
| 2009/0145910 A1 * | 6/2009 | Hyde | B65D 81/3811 220/592.2 |
| 2013/0068155 A1 | 3/2013 | Patel | |

FOREIGN PATENT DOCUMENTS

| | | |
|---|---|---|
| JP | 52-056585 | 5/1977 |
| JP | 58-501920 | 11/1983 |
| JP | 60-190825 | 9/1985 |
| JP | 2001-083020 | 3/2001 |
| JP | 4064697 B | 3/2008 |
| WO | 2013/170273 | 11/2013 |

OTHER PUBLICATIONS

Extended European Search Report issued in corresponding European Patent Application No. 15839338.9, 7 pages.
Office Action issued in corresponding Chinese Patent Application, Sep. 14, 2018, 15 pages with an English Translation.

* cited by examiner

THERMAL HISTORY CHANGE TYPE INDICATOR

TECHNICAL FIELD

The present invention relates to a thermal history change type indicator. More particularly, the present invention relates to a thermal history change type indicator reflecting the integration of temperature and time. In addition, the present invention relates to a set of a thermal history change type indicator and instant cup noodles comprising the thermal history change type indicator and instant cup noodles.

BACKGROUND ART

For some objects requiring temperature control, the total amount (cumulative value) of heat received by the objects with time is important in addition to temperature change for every time and temperature information at a certain moment. Examples of such objects include equipment and food.

For example, some equipment may cause trouble such as degradation and malfunction if it is heated to a certain temperature or higher. Further, some food must not be exposed to a predetermined temperature for a certain period of time or more for keeping quality, while some food needs to be exposed to a predetermined temperature for a certain period of time or more for safety and hygiene. Furthermore, also in the reconstitution (reconstitution with hot water) of instant cup noodles and the like, the total amount (cumulative value) of heat received with time is important.

Thus, several proposals have been made for a temperature-indicating label for checking the total amount (cumulative value) of heat received with time (refer to Patent Literature 1).

CITATION LIST

Patent Literature

Patent Literature 1: Japanese Patent No. 4064697

SUMMARY OF INVENTION

Technical Problem

Incidentally, in order to measure the total amount (cumulative value) of heat received with time, a region for sticking a temperature-indicating label needs to have no temperature unevenness. For example, the viscosity of wax changes with temperature.

Therefore, when a reaction is allowed to progress in the longitudinal direction as described in Patent Literature 1, the behavior of the temperature-indicating label will change if the sticking region has temperature unevenness. As a result, a problem will occur in that the accurate total amount (cumulative value) of heat cannot be measured.

The present invention has been made in view of the above problem. That is, an object of the present invention is to make it possible to be less influenced by temperature unevenness and to accurately measure the total amount (cumulative value) of heat received with time.

Solution to Problem

The present inventors have intensively studied a method of making it possible to be less influenced by temperature unevenness and to accurately measure the total amount (cumulative value) of heat received with time. As a result, the present inventors have found that it is made possible to be less influenced by temperature unevenness of the sticking region and to be easily visually recognized by changing the progress direction of a reaction to a vertical direction. This finding has led to the completion of the present invention.

In order to solve the above problem, the present invention provides a thermal history change type indicator, comprising: a thermally meltable material layer containing a thermally meltable material; a permeation layer, to one side of which color is applied, wherein the permeation layer becomes transparent or translucent when the thermally meltable material melts and permeates the permeation layer; a thermally meltable material permeation-inhibiting layer for inhibiting the permeation of the thermally meltable material into the permeation layer, wherein the thermally meltable material permeation-inhibiting layer is arranged between the thermally meltable material layer and the permeation layer; and a protective layer, wherein the thermally meltable material layer, the permeation layer, and the thermally meltable material permeation-inhibiting layer are layered, and the permeation layer side of the layered product is covered with the protective layer.

According to such a constitution, a thermally meltable material permeation-inhibiting layer is provided between a thermally meltable material layer and a permeation layer. Therefore, the thermally meltable material will not be absorbed from a surface to which color is applied, but will be gradually absorbed from the end of the permeation layer. Thus, the permeation area can be made visible as the total amount (cumulative value) of heat received with time by allowing the thermally meltable material to be gradually absorbed from the end of the permeation layer.

Further, the present invention provides a thermal history change type indicator, comprising: a thermally meltable material layer containing a thermally meltable material; colored paper; a permeation layer, wherein the permeation layer becomes transparent or translucent when the thermally meltable material melts and permeates the permeation layer; a thermally meltable material permeation-inhibiting layer for inhibiting the permeation of the thermally meltable material into the permeation layer, wherein the thermally meltable material permeation-inhibiting layer is arranged at least between the thermally meltable material layer and the colored paper or between the colored paper and the permeation layer; and a protective layer, wherein the thermally meltable material layer, the colored paper, the permeation layer, and the thermally meltable material permeation-inhibiting layer are layered, and the permeation layer side of the layered product is covered with the protective layer.

According to such a constitution, the colored paper and the permeation layer can be separately provided. Thus, colored paper to which complicated printing is applied can be used. Further, the thermally meltable material can be gradually absorbed from the end of the permeation layer by providing the thermally meltable material permeation-inhibiting layer at least between the thermally meltable material layer and the colored paper or between the colored paper and the permeation layer. Thus, the permeation area can be made visible as the total amount (cumulative value) of heat received with time by allowing the thermally meltable material to be gradually absorbed from the end of the permeation layer.

Furthermore, the present invention provides a thermal history change type indicator, comprising: a thermally meltable material layer containing a thermally meltable material; a permeation layer, wherein the permeation layer becomes transparent or translucent when the thermally meltable material melts and permeates the permeation layer; a colored thermally meltable material permeation-inhibiting layer for inhibiting the permeation of the thermally meltable material into the permeation layer, wherein the colored thermally meltable material permeation-inhibiting layer is arranged between the thermally meltable material layer and the permeation layer; and a protective layer, wherein the thermally meltable material layer, the permeation layer, and the colored thermally meltable material permeation-inhibiting layer are layered, and the permeation layer side of the layered product is covered with the protective layer.

According to such a constitution, the color of the thermally meltable material permeation-inhibiting layer can be visually recognized as the permeation layer becomes transparent or translucent. Therefore, the total amount (cumulative value) of heat received with time can be made visible.

Furthermore, the present invention provides a set of a thermal history change type indicator and instant cup noodles comprising the thermal history change type indicator and the instant cup noodles.

Effects of Invention

The present invention can make it possible to be less influenced by temperature unevenness and to accurately measure the total amount (cumulative value) of heat received with time.

DESCRIPTION OF EMBODIMENTS

Hereinafter, preferred embodiments for carrying out the present invention will be described in detail with reference to the drawings as appropriate. Note that the embodiments to be described below show an example of the representative embodiments of the present invention, and the scope of the present invention is not narrowly interpreted by the embodiments.

<<Thermal History Change Type Indicator 1>>

Figure 1:
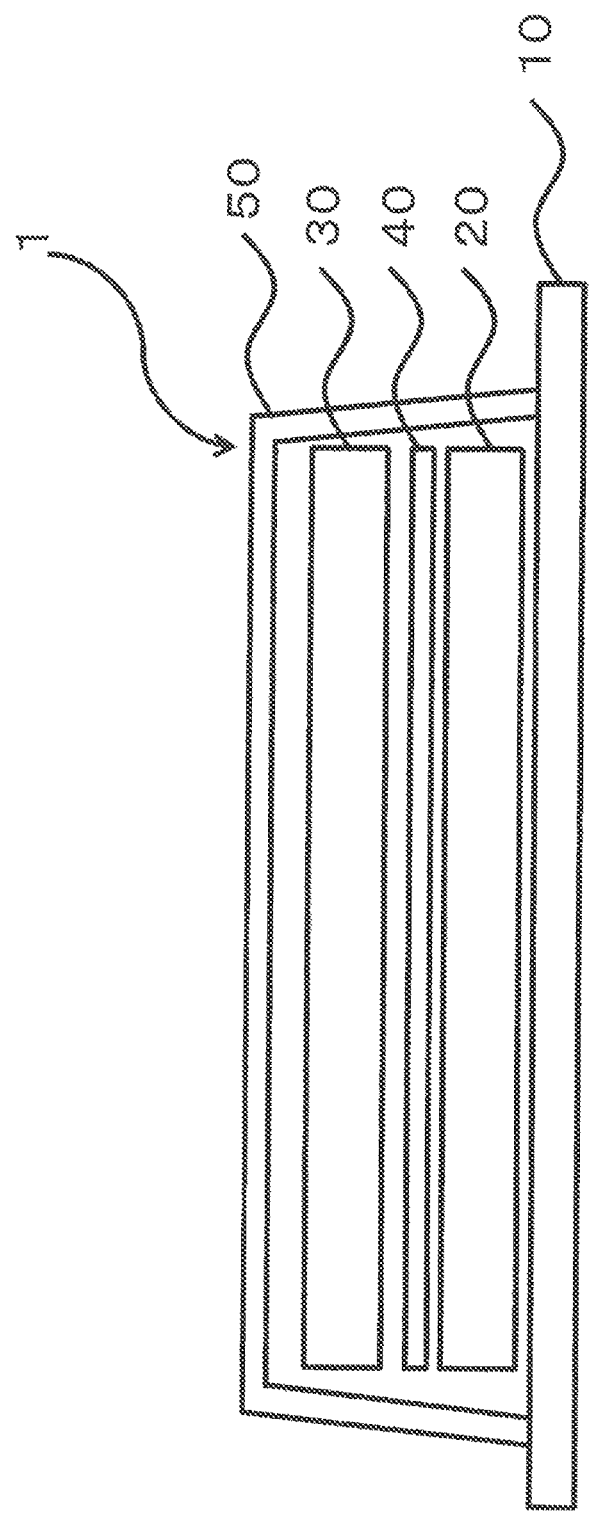
FIG. 1 is a schematic explanatory diagram of the thermal history change type indicator according to the present invention.

FIG. 1 is a schematic view of the thermal history change type indicator 1 according to the present invention. The thermal history change type indicator 1 according to the present invention, when roughly divided, comprises a base material 10, a thermally meltable material layer 20 containing a thermally meltable material, a permeation layer 30, to one side of which color is applied, wherein the permeation layer becomes transparent or translucent when the thermally meltable material permeates the permeation layer 30, a thermally meltable material permeation-inhibiting layer 40 for inhibiting the permeation of the molten thermally meltable material into the permeation layer 30 from the surface side, to which color is applied, of the permeation layer 30, and a protective layer 50 covering the whole surface. In addition, as shown in FIG. 1, the thermal history change type indicator 1 has a layered structure, in which the thermally meltable material layer 20, the thermally meltable material permeation-inhibiting layer 40, and the permeation layer 30 are layered in this order, and the layered product is sandwiched by the base material 10 and the protective layer 50.

Further, the thermally meltable material layer 20, the permeation layer 30, and the thermally meltable material permeation-inhibiting layer 40 preferably have the same size. Then, the base material 10 and the protective layer 50 preferably have a size larger than that of the above layers. An overlap width can be provided by enlarging the size of the base material 10 and the protective layer 50, which can seal the thermally meltable material layer 20, the thermally meltable material permeation-inhibiting layer 40, and the permeation layer 30.

Examples of the shape of the thermal history change type indicator 1 include, but are not particularly limited to, a circle and a polygon. Among these, a circle is preferred in terms of appearance because the thermally meltable material concentrically permeates from the end face. Further, a quadrangle is preferred in terms of productivity because cut loss is small.

A method of producing the thermal history change type indicator 1 according to the present invention is not particularly limited. For example, the thermal history change type indicator 1 can be formed as follows: a thermally meltable material layer 20, a thermally meltable material permeation-inhibiting layer 40, and a permeation layer 30 are previously layered. The layered product is then punched into a desired shape. The punched layered product is arranged on the base material 10, followed by covering the layered product and the base material 10 with a protective layer 50. Finally, the whole is punched into a desired shape to provide the thermal history change type indicator 1. Alternatively, the thermal history change type indicator 1 can be formed using the thermally meltable material layer 20, the thermally meltable material permeation-inhibiting layer 40, and the permeation layer 30, which have been previously punched into a desired shape.

Next, each component of the thermal history change type indicator 1 according to the present invention will be described.

(1) Base Material 10

The base material 10 is selected by the constitution of an adherend. The base material 10 is located in the lowermost layer of a thermal history change type indicator 1 for covering a thermally meltable material layer 20, a thermally meltable material permeation-inhibiting layer 40, and a permeation layer 30 together with a protective layer 50 to be described below. The base material 10 is preferably aluminum foil or a plastic base material, and when the base material 10 has a label form, it preferably has a pressure sensitive adhesive layer on one side. The base material 10 can be stuck on a container or a lid for instant cup noodles by providing the pressure sensitive adhesive layer.

The base material 10 is composed of, for example, releasing paper, a pressure sensitive adhesive layer, and a support. At this time, the support is preferably the one having the function of not being impregnated with a thermally meltable material described below. Specific examples include aluminum foil, plastic films such as polypropylene film and polyester film, and oil repellent finished paper. Note that when at least a thermal history change type indicator 1 is separately incorporated into a container using an adhesive or the like, the releasing paper and the pressure sensitive adhesive layer need not be provided in the base material 10, but only the support may be provided therein.

The base material 10 is preferably the one having good thermal conductivity. Here, the one having good thermal conductivity means roughly the one that has a small temperature loss and can conduct the temperature in a container to the thermally meltable material layer 20 almost without loss.

The size of the base material 10 is preferably larger than the thermally meltable material layer 20, the thermally meltable material permeation-inhibiting layer 40, and the permeation layer 30 to be described below.

(2) Thermally meltable Material Layer 20

The thermally meltable material layer 20, which is placed between the base material 10 and the permeation layer 30 to be described below, contains a thermally meltable material for making the permeation layer 30 translucent or transparent. The amount of the thermally meltable material contained may be, but is not particularly limited to, an amount required for making the permeation layer 30 transparent or translucent.

An organic compound having a melting point of 50° C. or more, preferably 60° C. or more, is preferably used as the thermally meltable material. Examples of such a compound include aliphatic compounds, aromatic compounds, and heterocyclic compounds, each having a polar group such as an alcohol, ester, amide, ketone, or ether group. Further, specific examples thereof include amide compounds, such as ethylene bis-stearamide, methylol stearamide, undecylamide, lauryamide, myristylamide, palmitylamide, stearylamide, and docosylamide; alcoholic compounds, such as behenyl alcohol, stearyl alcohol, myristyl alcohol, and oleyl alcohol; ester compounds, such as tetradecyl stearate, octadecyl stearate, hexadecyl palmitate, benzyl behenate, stearyl salicylate, cetyl benzoate, dimyristyl sebacate, dicetyl azelate, distearyl adipate, distearyl sebacate, tristearin, tripalmitin, and trimyristin; ketone compounds, such as stearone, lauron, and dioctyl ketone; and ether compounds, such as 1,2-diphenoxyethane and β-naphthol benzyl ether.

Further, when the thermally meltable material is used for food, saturated hydrocarbons or unsaturated hydrocarbons are preferably used in terms of safety, transparency, temperature-indicating properties, and the like. The saturated hydrocarbons and unsaturated hydrocarbons can be properly used according to the temperature range and characteristics.

Examples of saturated hydrocarbons include paraffin wax, microcrystalline wax, Sasolwax, and liquid paraffin. Among these, a saturated hydrocarbon containing a paraffin wax that can be represented by a chemical substance $C_nH_{2n+2}$ as a main component is particularly preferred, in which the number n is particularly preferably 24 to 60. Note that the smaller the number n, the lower the melting point, and conversely, the larger the number n, the higher the melting point.

Examples of unsaturated hydrocarbons include polyethylene wax, olefin, and polyolefin wax.

The molecular structure of the thermally meltable material is preferably a linear paraffin wax. As the linearity of the molecular structure is higher, the linear paraffin wax is more easily isolated in the heavy oil refining, and the temperature range of the melting point is narrower. Therefore, such a paraffin wax is excellent in temperature-indicating properties. Further, since it also has a lower surface tension, the impregnation speed into the permeation layer 30 is higher.

In the present invention, materials other than the above can be employed as the thermally meltable material. Examples of these materials include, but are not limited to, fluids selected from the group consisting of viscous fluids, viscoelastic fluids, and mixtures thereof.

The surface tension of the thermally meltable material is not particularly limited, but, for example, the surface tension of the thermally meltable material at 80° C. is preferably in the range of $1.0 \times 10^{-2}$ to $1.0 \times 10^2$ mN/m, more preferably in the range of $1.0 \times 10^{-1}$ to $5.0 \times 10$ mN/m, and further preferably in the range of 5.0 to $3.0 \times 10$ mN/m.

The viscosity of the thermally meltable material is not particularly limited, but, for example, the viscosity of the thermally meltable material at 80° C. is preferably in the range of $1.0 \times 10^{-2}$ to $1.0 \times 10^2$ mPa·s, more preferably in the range of $1.0 \times 10^{-1}$ to $6.0 \times 10$ mPa·s, and further preferably in the range of 1.0 to $4.0 \times 10$ mPa·s.

The refractive index of the thermally meltable material is not particularly limited, but, for example, the refractive index of the thermally meltable material at 23° C. is preferably in the range of 0.8 to 2.0, more preferably in the range of 1.0 to 1.8, and further preferably in the range of 1.4 to 1.6. The thermally meltable material preferably has a refractive index at substantially the same level as the permeation layer to be described below (for example, the refractive index of cellulose constituting the fiber of paper is 1.49) because the transparency of the permeation layer increases after permeation.

For the control of permeation, only one type of a thermally meltable material may be used, or a plurality of thermally meltable materials each having different melting point and/or viscosity may be used in combination.

Further, the thermally meltable material may be mixed with an auxiliary agent for improving coatability and brittleness after coating, and, optionally, with a coloring agent such as pigment and dye and a perfume.

The thermally meltable material layer 20 according to the present invention may also be prepared by directly applying a molten thermally meltable material to a base material using a device such as a dispenser. Further, a sheet in which a base material is impregnated with a thermally meltable material may be prepared to thereby use the sheet as a continuous sheet which can be layered. For example, a material having pores, such as Japanese paper and a nonwoven fabric, is preferred as a base material. Since the coating amount of the thermally meltable material determines the oozing amount of the thermally meltable material, it is preferred to use a base material which has a low density and allows high coating amount.

Further, the produced thermally meltable material layer 20 may be in a rolled form or may be previously cut to a predetermined size. Note that the shape of the thermally meltable material layer 20 is preferably the same as the shape of the permeation layer 30 to be described below.

(3) Permeation Layer 30

The permeation layer 30 according to the present invention becomes transparent or translucent by the permeation of a molten thermally meltable material.

The permeation layer 30 according to the present invention is preferably a porous or fibrous sheet made of a material having a refractive index equal to that of the thermally meltable material. Examples of the permeation layer 30 which is preferably used include paper, nonwoven fabric made of composite fiber including alumina fiber, glass fiber, rayon fiber, polyvinyl alcohol, cellulose fiber, polyolefin fiber (including polypropylene, polyethylene, nylon, and polyester), foamed plastic sheets, and urethane foam.

A mechanism in which the permeation layer 30 of the present invention becomes transparent or translucent will be described as follows taking paper as an example. The refractive index of cellulose constituting the fiber of paper is 1.49, while the refractive index of air is 1.00, which is greatly different from that of the cellulose. Since paper contains air in an amount of around 50% of its volume, a large number of fine voids are present in the paper layer.

Therefore, since light is intricately refracted at innumerable interfaces between cellulose and air, paper looks white and opaque. When a thermally meltable material having a refractive index close to that of cellulose permeates the paper, the voids will be filled with it to have a uniform refractive index. As a result, since the intricate interface refraction is lost, the paper becomes transparent or translucent.

The refractive index of the permeation layer 30 according to the present invention depends on the refractive index of a thermally meltable material. For example, the refractive index of the permeation layer 30 at 23° C. is preferably in the range of the refractive index of a thermally meltable material ±0.3, more preferably in the range of the refractive index of a thermally meltable material ±0.2, and further preferably in the range of the refractive index of a thermally meltable material ±0.1.

The permeation layer 30 according to the present invention can be adjusted by arbitrarily changing the density, void ratio, and area shape so that the thermally meltable material can complete the permeation within target time. This is because the impregnation speed of the thermally meltable material is affected by the density, void ratio, and area shape. Further, the permeation layer 30 preferably has a thickness and a basis weight in such a degree that the permeation layer easily contains the thermally meltable material.

One-side art paper, to one side of which color is applied, is preferably used as the permeation layer according to the present invention in terms of productivity and cost. The color applied to the one-side art paper is preferably, but not particularly limited to, a color in which the change of color can be easily visually recognized when the color is used in the indicator.

Further, when the one-side art paper is used, a surface to which color is applied is preferably arranged facing downward (to the thermally meltable material layer 20 side). Before use, a surface to which is not applied color (normally white) can mask the applied color by arranging the colored surface in this way. Then, when the thermally meltable material permeates, the applied color can be visually recognized by the change of the uncolored surface from white to transparent or translucent, which allows the contrast change of color to be significantly recognized.

In the present invention, the permeation layer 30 has the same size as the thermally meltable material layer 20 and is formed smaller than the base material 10 and the protective layer 50 to be described below. This is because if the permeation layer 30 is too large, a sealed space cannot be formed by the base material 10 and the protective layer 50.

The shape of the permeation layer 30 is preferably, but not particularly limited to, a circle. When the shape is a circle, the change of color is easily recognized because the color changes toward the center of the circle. Further, a quadrangle is preferred in terms of productivity because cut loss is small.

(4) Thermally meltable Material Permeation-Inhibiting Layer 40

The thermally meltable material permeation-inhibiting layer 40 is a layer provided between the thermally meltable material layer 20 and the permeation layer 30 for preventing the permeation of a molten thermally meltable material from the surface side, to which color is applied, of the permeation layer 30. The thermally meltable material permeation-inhibiting layer 40 preferably covers the entire surface, to which color is applied, of the permeation layer 30. Thereby, the molten thermally meltable material can be induced so that it may gradually permeate from the end face of the permeation layer 30.

The thermally meltable material permeation-inhibiting layer 40 is not particularly limited as long as the thermally meltable material does not permeate the layer, or the layer is oil-repellent. Examples of the thermally meltable material permeation-inhibiting layer 40 include oil-repellent members, such as paper coated with an oil-repellent material such as overprint varnish and a plastic film such as a PET film. When the oil-repellent material is used, it may be integrally formed with the permeation layer 30.

Further, a colored plastic film such as a colored PET film may be used as the thermally meltable material permeation-inhibiting layer. When the permeation layer becomes transparent or translucent, the color of the colored plastic film can be visually recognized. Therefore, such a thermally meltable material permeation-inhibiting layer can be used in the indicator even if color is not applied to the permeation layer.

Note that when paper in which a coating layer is provided on the surface, to which color is applied, is used as the permeation layer 30, the coating layer and the printing may play the role of the thermally meltable material permeation-inhibiting layer 40.

(4) Protective Layer 50

The protective layer 50 according to the present invention is located at the top of the thermal history change type indicator 1 for covering and sealing the thermally meltable material layer 20, the permeation layer 30, and the thermally meltable material permeation-inhibiting layer 40, in combination with the base material 10. This prevents the position of the thermally meltable material layer 20, the permeation layer 30, and the thermally meltable material permeation-inhibiting layer 40 from being misaligned. Further, this prevents the permeation layer 30 from becoming translucent or transparent by the entry of moisture, water, and the like from the outside. Further, a molten thermally meltable material can reach the end face of the permeation layer 30 along the protective layer 50 without oozing out of the indicator.

The material of the protective layer 50 is not particularly limited as long as it is transparent, and is preferably a material which hardly undergoes cohesive peeling from the support of the base material 10. Examples of the protective layer 50 include a polyester film, a polypropylene film, and a polyethylene film. Further, a pressure sensitive adhesive layer may be provided on one side of the protective layer 50. By providing the pressure sensitive adhesive layer, the protective layer 50 can form a closed space with the base material 10.

In the present invention, it is preferred to have a small gap between the protective layer 50 and the thermally meltable material layer 20 and the permeation layer 30, as shown in FIG. 1. By the presence of the gap, a molten thermally meltable material can permeate from the end face of the permeation layer 30. Note that a gap may be provided between the permeation layer 30 and the protective layer 50 by making the permeation layer 30 slightly smaller than the thermally meltable material layer 20.

Further, the present invention relates to a set of a thermal history change type indicator and instant cup noodles comprising the thermal history change type indicator 1 according to the present invention and the instant cup noodles. The thermal history change type indicator 1 may be previously stuck on instant cup noodles, or may be stuck by a user at the time of use. Examples of the position on which the thermal history change type indicator 1 is stuck include a lid and a container external wall of the instant cup noodles. Among these, sticking on a lid is preferred. When hot water is poured into the instant cup noodles having the thermal history change type indicator 1 stuck, the thermal history change type indicator 1 is discolored in conjunction with the temperature in a container, and the degree of reconstitution with hot water of instant cup noodles can be easily visually recognized.

In the set of the thermal history change type indicator of the present invention and instant cup noodles, the components of the thermal history change type indicator 1 (base material 10, thermally meltable material layer 20, permeation layer 30, thermally meltable material-inhibiting layer 40, and protective layer 50) can be arbitrarily selected based on the quantity of heat required for reconstitution of instant cup noodles with hot water and the material, the shape, and the like of a lid or a container of instant cup noodles.

Next, the action mechanism of the thermal history change type indicator 1 according to the present invention will be described. Note that, here, a case where the thermal history change type indicator 1 is stuck on the lid of instant cup noodles will be described as an example.

The thermal history change type indicator 1 according to this example has a structure where, on a base material 10 made of a PET film having a double-sided pressure sensitive adhesive layer, are layered a circular thermally meltable material layer 20 impregnated with paraffin wax having a melting point of 76° C., a circular permeation layer 30 in which the printing surface side of one-side art paper (basis weight: 79 g/m$^2$) is subjected to oil-repellent treatment with varnish, and a protective layer 50 made of single-sided pressure sensitive adhesive polyester film as a top layer. Note that, here, the varnish plays the role of a thermally meltable material-inhibiting layer 40.

Here, the melting point of the thermally meltable material used for instant cup noodles or the like is preferably in the range of 45° C. to 90° C., more preferably in the range of 70° C. to 85° C. This is because, even if hot water at 100° C. is poured into instant cup noodles, the temperature of the lid of instant cup noodles will not reach 100° C. due to the temperature gradient between 100° C. and outside air temperature, and the like. Further, the temperature of the lid is higher close to the center of the lid, and the temperature decreases towards the periphery (particularly near the opened part) of the lid. Therefore, a maximum temperature difference of about 10° C. is generated depending on the position of the lid. Therefore, if the melting-point temperature of the thermally meltable material is too high, the discoloration reaction will not progress, and conversely, if the melting-point temperature of the thermally meltable material is too low, the discoloration reaction may progress depending on a storage condition or during the transportation of the product.

First, the thermal history change type indicator 1 according to the present invention is stuck on the lid of instant cup noodles. Subsequently, the lid of instant cup noodles is opened to half; hot water is poured into a container; and the lid is closed again. Note that the thermal history change type indicator 1 may be used by sticking it on the container external wall of instant cup noodles instead of the lid.

Figure 2:
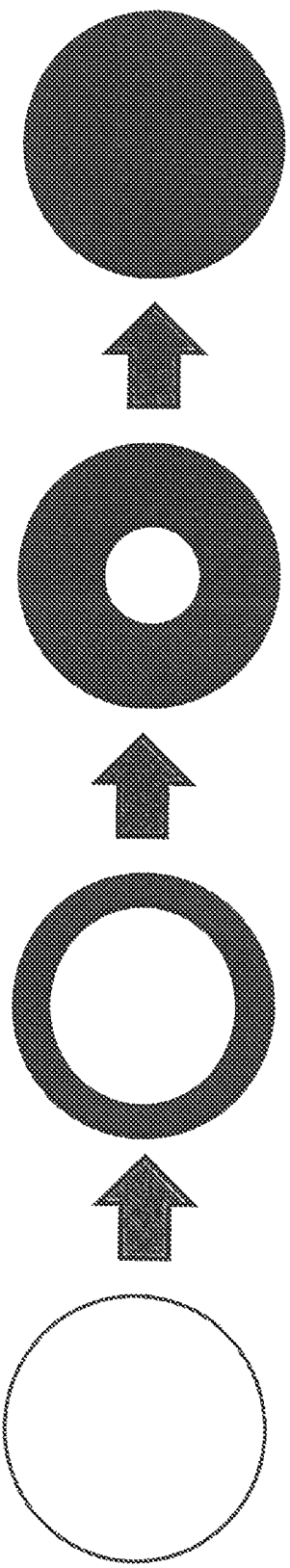
FIG. 2 is an explanatory diagram showing the degree of progress of the discoloration reaction of the thermal history change type indicator according to the present invention.

When hot water is poured into a container, the temperature on the surface of the lid will increase to melt a thermally meltable material. The molten thermally meltable material permeates from the end face of the permeation layer 30. Then, when the permeation layer 30 becomes translucent or transparent, the applied color will be seen through (refer to FIG. 2). Note that, since the permeation layer 30 does not become opaque again once it becomes translucent or transparent, it is easily visually recognized.

For example, in an environment of an outside air temperature of 23° C., when hot water at 100° C. is poured into instant cup noodles, the central temperature of the lid will reach even about 85° C. at the beginning. Thus, the melting of the thermally meltable material occurs. Since the temperature of the lid is high, the viscosity of the thermally meltable material is low, and it permeates the permeation layer 30 quickly. Since the temperature of the lid gradually decrease with the lapse of time, the viscosity of the thermally meltable material gradually increases to reduce the permeation into the permeation layer 30.

Finally, when the whole area of the permeation layer 30 becomes translucent or transparent (that is, at the time point when the printing can be visually recognized on the whole area), it is understood that the reconstitution of noodles has completed.

As described above, in the present invention, since the degree of reconstitution can be verified in conjunction with the temperature in a container, it is possible to return noodles to the degree of reconstitution intended by the maker even in the outdoors where no clock is available or in the case where the temperature of hot water is low. Further, since the reaction can be progressed in the vertical direction, the indicator can be less influenced by the temperature unevenness even in a place where there is a temperature difference according to a sticking region.

The present invention is not limited to the above example.

For example, although a permeation layer 30, to one side of which color is applied, was described in the above example, a structure in which the permeation layer is layered on colored paper may be employed. At this time, it is preferred to cover the whole colored paper with a thermally meltable material permeation-inhibiting layer so that the colored paper may not be impregnated with a thermally meltable material. Further, a coating layer may be provided on colored paper. In this case, the coating layer plays the role of a thermally meltable material permeation-inhibiting layer. Furthermore, when colored paper is used, a thermally meltable material permeation-inhibiting layer may be provided at least between a thermally meltable material layer and colored paper or between colored paper and a permeation layer. The effect of the present invention is produced also in this case.

Further, although the description was made on the case of using a base material in the above example, a thermal history change type indicator may be provided directly on a container, a lid, or the like of instant cup noodles without using the base material. In this case, a thermally meltable material layer, a thermally meltable material permeation-inhibiting layer, and a permeation layer may be layered on the container or the lid of instant cup noodles, and the layered product may be covered and sealed with a protective layer.

Further, the description was made on the case where an absorber (paper) was impregnated with a thermally meltable material in the above example, but the use of the thermally meltable material is not limited to this case, and the thermally meltable material in a solid form may be used as it is without being impregnated into paper.

In the present invention, a member for helping the visual recognition effect may be further provided on a permeation layer. For example, when a thermal history change type indicator is made circular, the reaction comes to an end at the center. Therefore, the end of the reaction can be more easily visually recognized by providing, on a permeation layer, doughnut-shaped paper made of a material which does not become transparent or translucent with a thermally meltable material.

Reference Signs List

1 Thermal history change type indicator
10 Base material
20 Thermally meltable material layer
30 Permeation layer
40 Thermally meltable material permeation-inhibiting layer
50 Protective layer

The invention claimed is:

1. A thermal history change type indicator, comprising:
a thermally meltable material layer comprising a thermally meltable material;
a permeation layer, to one side of which color is applied, wherein the permeation layer becomes transparent or translucent when the thermally meltable material melts and permeates the permeation layer;
a thermally meltable material permeation-inhibiting layer that prevents permeation of the thermally meltable material into the permeation layer through the thermally meltable material permeation-inhibiting layer; and
a protective layer,
wherein the thermally meltable material layer, the thermally meltable material permeation-inhibiting layer, and the permeation layer are layered vertically in this order, so as to form a laminate,
the protective layer covers the laminate from a side of the permeation layer of the laminate, and
the melted thermally meltable material in the thermally meltable material layer permeates the permeation layer from a rim portion of the permeation layer toward a center portion thereof, so that the thermal history change type indicator visualizes a cumulative value of heat that the thermally meltable material has received with time, with a permeation area in the permeation layer.

2. A set of a thermal history change type indicator and instant cup noodles, comprising: the thermal history change type indicator according claim 1 and instant cup noodles.

3. The thermal history change type indicator according to claim 1, wherein the indicator is in a quadrangular shape or a round shape.

4. The thermal history change type indicator according to claim 1,
wherein the thermal history change type indicator further comprises a base material under the thermally meltable material layer of the laminate,
the protective layer and the base material enclose the laminate entirely, and
when the thermally meltable material is melted, the thermally meltable material moves from the thermally mealtable material layer to the rim portion of the permeation layer along the protective layer.

5. A thermal history change type indicator, comprising:
a thermally meltable material layer comprising a thermally meltable material;
a colored paper;
a permeation layer,
wherein the permeation layer becomes transparent or translucent when the thermally meltable material melts and permeates the permeation layer;
a thermally meltable material permeation-inhibiting layer that prevents permeation of the thermally meltable material into the permeation layer through the thermally meltable material permeation-inhibiting layer wherein the thermally meltable material permeation-inhibiting layer is arranged at least between the thermally meltable material layer and the colored paper or between the colored paper and the permeation layer; and
a protective layer,
wherein the thermally meltable material layer, the thermally meltable material permeation-inhibiting layer, the colored paper, and the permeation layer, are layered vertically in this order or in an order of the thermally meltable material layer, the colored paper, the thermally meltable material permeation-inhibiting layer, and the permeation layer, so as to form a laminate,
the protective layer covers the laminate from a side of the permeation layer of the laminate, and
the melted thermally meltable material in the thermally meltable material layer permeates the permeation layer from a rim portion of the permeation layer toward a center portion thereof, so that the thermal history change type indicator visualizes a cumulative value of heat that the thermally meltable material has received with time, with a permeation area in the permeation layer.

6. A set of a thermal history change type indicator and instant cup noodles, comprising: the thermal history change type indicator according to claim 5 and instant cup noodles.

7. The thermal history change type indicator according to claim 5, wherein the indicator is in a quadrangular shape or a round shape.

8. The thermal history change type indicator according to claim 5,
wherein the thermal history change type indicator further comprises a base material under the thermally meltable material layer of the laminate,
a combination of the protective layer and the base material encloses the laminate entirely, and
when the thermally meltable material is melted, the thermally meltable material moves from the thermally mealtable material layer to the rim portion of the permeation layer along the protective layer.

9. A thermal history change type indicator, comprising:
a thermally meltable material layer comprising a thermally meltable material;
a permeation layer,
wherein the permeation layer becomes transparent or translucent when the thermally meltable material melts and permeates the permeation layer;
a colored thermally meltable material permeation-inhibiting layer that prevents permeation of the thermally meltable material into the permeation layer through the colored thermally meltable material permeation-inhibiting layer; and
a protective layer,
wherein the thermally meltable material layer, the colored thermally meltable material permeation-inhibiting layer, and the permeation layer are layered vertically in this order, so as to form a laminate,
the protective layer covers the laminate from a side of the permeation layer of the laminate, and the melted
thermally meltable material in the thermally meltable material layer permeates the permeation layer from a rim portion of the permeation layer toward a center portion thereof, so that the thermal history change type indicator visualizes a cumulative value of heat that the thermally meltable material has received with time, with a permeation area in the permeation layer.

10. A set of a thermal history change type indicator and instant cup noodles, comprising: the thermal history change type indicator according to claim 9 and instant cup noodles.

11. The thermal history change type indicator according to claim 9, wherein the indicator is in a quadrangular shape or a round shape.

12. The thermal history change type indicator according to claim 9,
- wherein the thermal history change type indicator further comprises a base material under the thermally meltable material layer of the laminate,
- the protective layer and the base material enclose the laminate entirely, and
- when the thermally meltable material is melted, the thermally meltable material moves from the thermally mealtable material layer to the rim portion of the permeation layer along the protective layer.

\* \* \* \* \*